(12) United States Patent
Bertolini et al.

(10) Patent No.: US 9,975,702 B2
(45) Date of Patent: May 22, 2018

(54) LOAD AND UNLOAD SYSTEM APPLIED TO CONVEYOR WITH DOUBLE FLOW

(76) Inventors: Dionisio Bertolini, Castro (BR); Jose Bertolini, Castro (BR)

( * ) Notice: Subject to any disclaimer, the term of this patent is extended or adjusted under 35 U.S.C. 154(b) by 859 days.

(21) Appl. No.: 13/449,299

(22) Filed: Apr. 17, 2012

(65) Prior Publication Data
US 2013/0272826 A1 Oct. 17, 2013

(51) Int. Cl.
| | |
|---|---|
| *B65G 19/14* | (2006.01) |
| *B65G 23/10* | (2006.01) |
| *B65G 65/32* | (2006.01) |
| *B65G 47/72* | (2006.01) |
| *B65G 47/78* | (2006.01) |

(52) U.S. Cl.
CPC ............ *B65G 19/14* (2013.01); *B65G 23/10* (2013.01); *B65G 47/72* (2013.01); *B65G 47/78* (2013.01); *B65G 65/32* (2013.01)

(58) Field of Classification Search
CPC ........ B65G 19/14; B65G 19/04; B65G 19/06; B65G 19/08; B65G 19/12; B65G 19/16; B65G 65/32; B65G 65/30; B65G 69/00; B65G 37/00; B65G 37/005; B65G 2201/02; B65F 3/28; B07C 5/36
USPC .. 198/348, 367, 370.08, 370.1, 370.01, 540, 198/541, 550.01, 728; 414/293, 287, 298, 414/299, 300, 301, 304, 305
See application file for complete search history.

(56) References Cited

U.S. PATENT DOCUMENTS

| | | | | |
|---|---|---|---|---|
| 785,630 | A * | 3/1905 | McClave | 198/532 |
| 1,935,437 | A * | 11/1933 | Elmer | 198/716 |
| 2,007,874 | A * | 7/1935 | Redler | 198/363 |
| 2,147,199 | A * | 2/1939 | Hapman | 198/716 |
| 2,279,862 | A * | 4/1942 | Sinden | B65G 19/16 198/716 |
| 2,438,083 | A * | 3/1948 | Whitney | B65G 19/16 198/629 |
| 2,776,042 | A * | 1/1957 | Ruppe | B65G 19/16 198/731 |
| 2,813,640 | A * | 11/1957 | Loomis | 406/67 |
| 2,922,511 | A * | 1/1960 | Ruppe | 198/730 |
| 3,586,155 | A * | 6/1971 | Turrentine et al. | 198/359 |
| 4,380,284 | A * | 4/1983 | Ito et al. | 198/494 |
| 4,512,705 | A * | 4/1985 | Gutsch | 414/327 |
| 4,890,723 | A * | 1/1990 | Debuisson et al. | 198/716 |
| 5,125,771 | A * | 6/1992 | Herman et al. | 406/57 |
| 5,383,547 | A * | 1/1995 | Noda | 198/728 |
| 5,622,467 | A * | 4/1997 | Pethullis | 414/304 |

(Continued)

FOREIGN PATENT DOCUMENTS

| | | | | |
|---|---|---|---|---|
| DE | 3333432 A1 * | 4/1985 | | B65G 47/72 |
| EP | 2641853 A1 * | 9/2013 | | B65G 19/14 |

*Primary Examiner* — Glenn F Myers

(57) ABSTRACT

The present report is about the patent of an innovative system utilized in the transportation, load and unload of grains or seeds for silos of storage, dryers and industrial units, being able to be installed directly in vertical silos and or adapted in the conventional principles of transportation as a group or independently, consisting of limits of change of direction and composed by driving and motor gears and points of load and unload respectively, generally established in the extremities of the assembly, hopper of load formed by an upper opening and double system of unload composed by floodgates arranged in the periphery of both intervals of the pipes and provided in transit or channels.

4 Claims, 9 Drawing Sheets

(56) References Cited

U.S. PATENT DOCUMENTS

| | | | |
|---|---|---|---|
| 6,142,291 A * | 11/2000 | Schulze et al. | 198/727 |
| 7,918,330 B2 * | 4/2011 | Bertolini | 198/716 |
| 2007/0170043 A1 * | 7/2007 | Raijmakers | 198/805 |
| 2009/0266680 A1 * | 10/2009 | Bertolini | 198/728 |

* cited by examiner

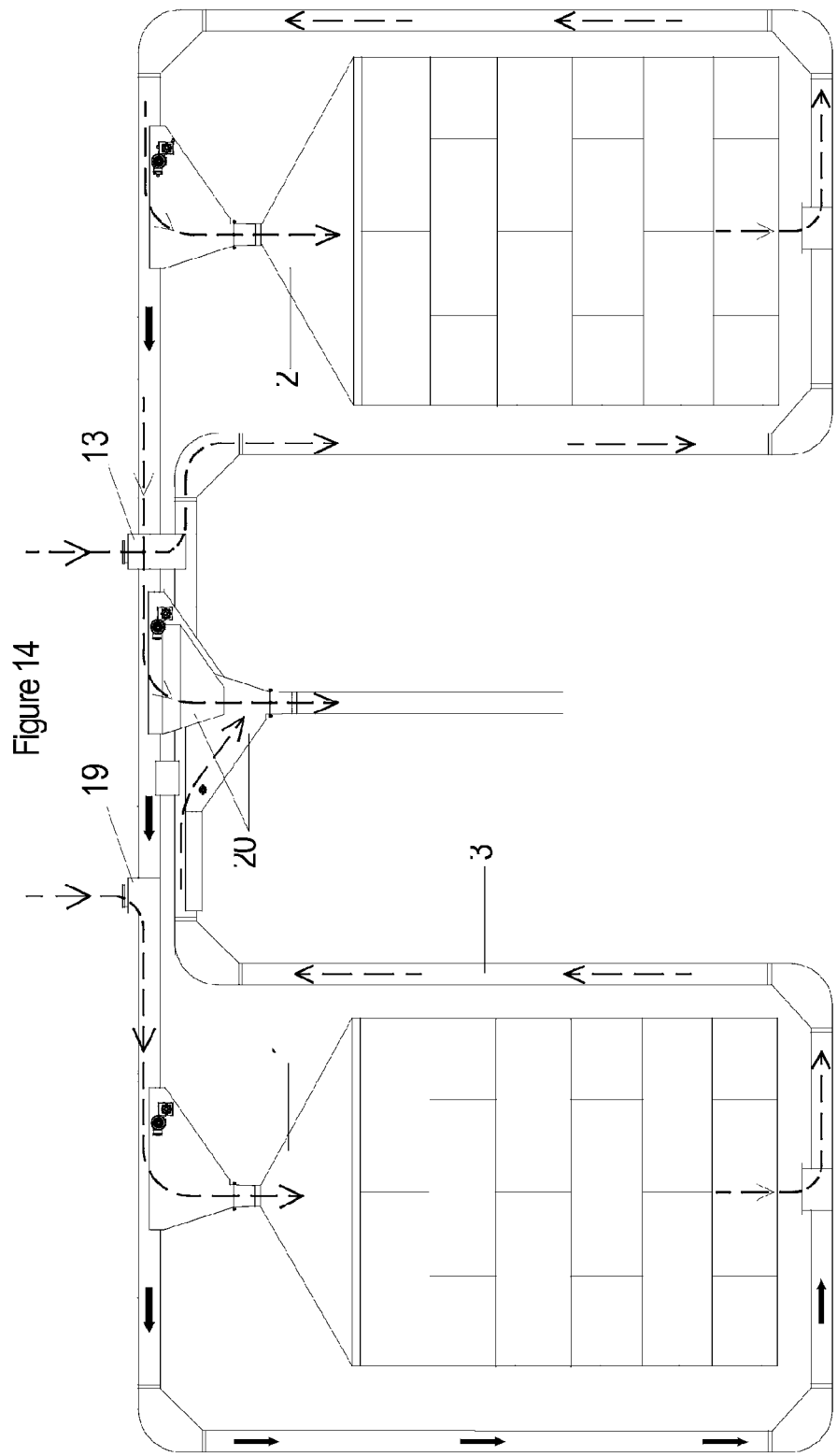

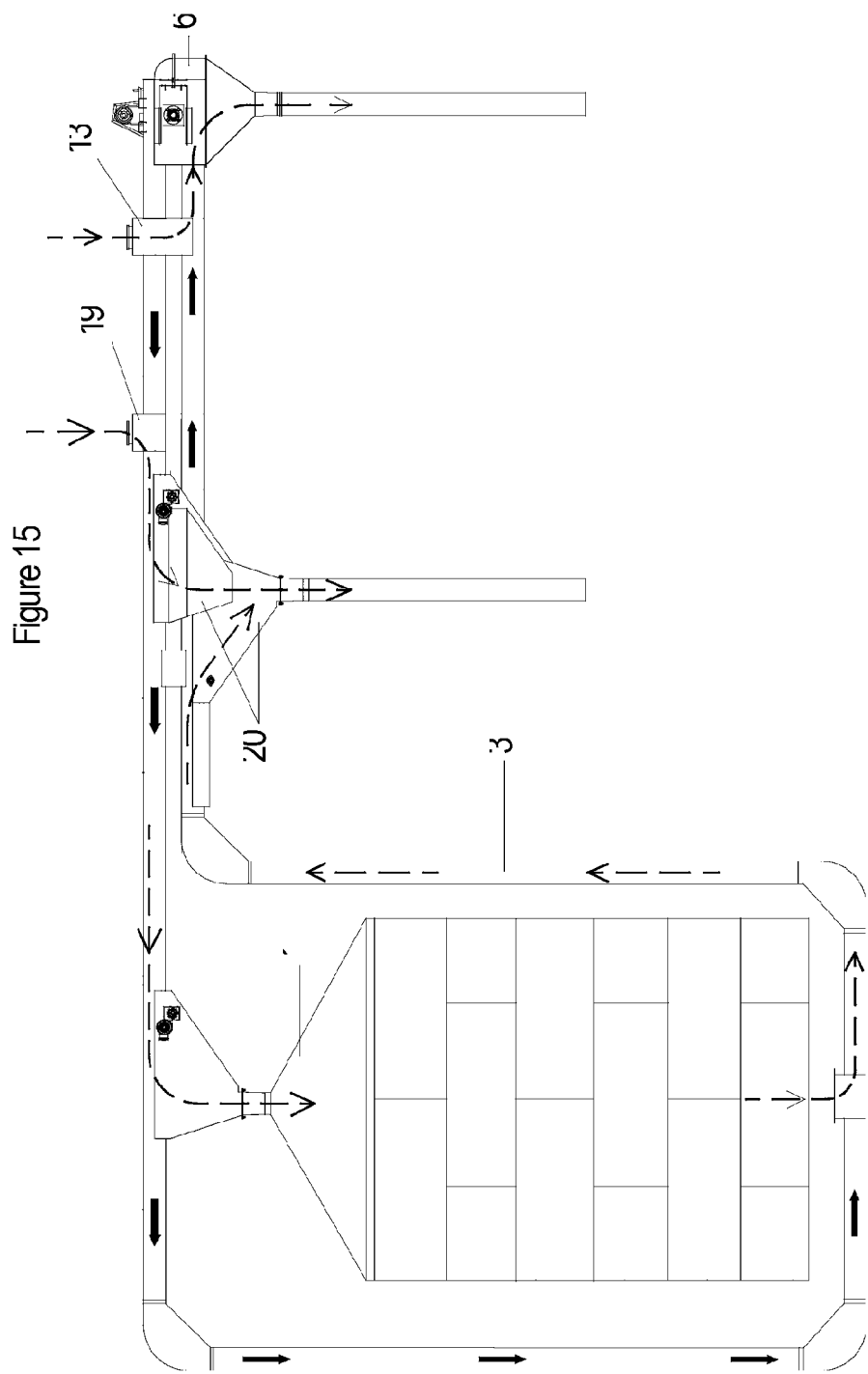

LOAD AND UNLOAD SYSTEM APPLIED TO CONVEYOR WITH DOUBLE FLOW

The current invention is consists of an innovative system utilized in the transportation, load and unload of grains, fruits or seeds for silos of storage, dryers and industrial units, providing attributes that enlarge the possibilities of load and unload of the products utilizing the same conveyor.

At present, the transporting systems of grains and fruits in more efficient silos, like the conveyors of circular section or drag chain conveyors of square or rectangular section, generally act in closed circuit or cyclic in an only sense among the bases, walls and height of the silos presenting, in strategic points of the assembly, loading places and unload openings of the bulk products. Then, the other systems consist in jugs elevators, transporting threads and conveyor belts, being able to operate together or independent, varying to each disposition utilized or to each need of the rural or industrial producer.

Those types of conveyors are employed to displace the agricultural products from trucks toward the interior of the silos, transportation of the products from one silo to another, conduction for bagging, among others processes, always needing a point of load and another for unload to produce such a movement.

The difficulty found in the conveyors, without distinction, consists of the limitation of the points of load and unload, restricted along the diversity of products to be moved, that is to say, during the transportation or movement of a type of agricultural product, the conveyors do not offer possibilities that a second product is displaced or transported simultaneously without contact with the first one, having to obligatorily wait to the end of the first proceeding so that it is possible to initiate a new procedure.

The following proposal presents an innovative version in the transportation of agricultural products and industries, seeking to soften and to expand points of load, transportation and unload of bulk products, returning to the efficient and more versatile, transporting assembly.

BRIEF DESCRIPTION OF THE FIGURES

The description that follows, all to title of not restrictive example, will cause to understand the technology in an objective and clear form, having as an example the designs mentioned listed below:

FIGS. 14 and 15, illustrations representing one of the conventional systems of transportation employing independently the components belonging to the conveyor with double flow.

DETAILED DESCRIPTION OF THE INVENTION

The system of load and unload applied to the conveyor with double flow 4 offers diverse forms of installation, in this case, as an illustrative example only, the disposition can be installed directly in the vertical silos 1 and 2 (FIG. 1) or adapted in other conventional principles of transportation of grains, fruits or seeds 3 (FIG. 2), like conveyors of circular section (PI0301803-2 and MU8801337-5), drag chain conveyors or any type of conveyor that allows the cluster of the double system of transportation. The ornamental representation of the pointed arrows refers to the entrance and exit of various products that always accompany the sense of movement of the conveyors (represented by dark arrows).

Figure 3:
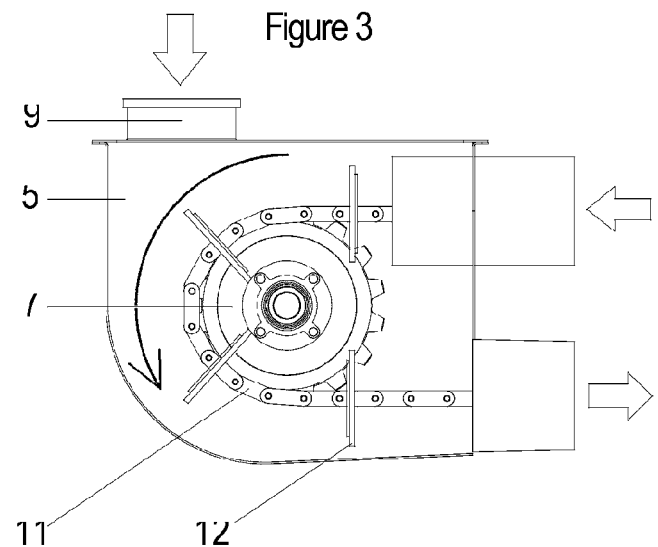
FIGS. 3 and 4, partial lateral reslice views, emphasizing the direction change limits of the draggers and of the gears of the internal part.
Figure 4:
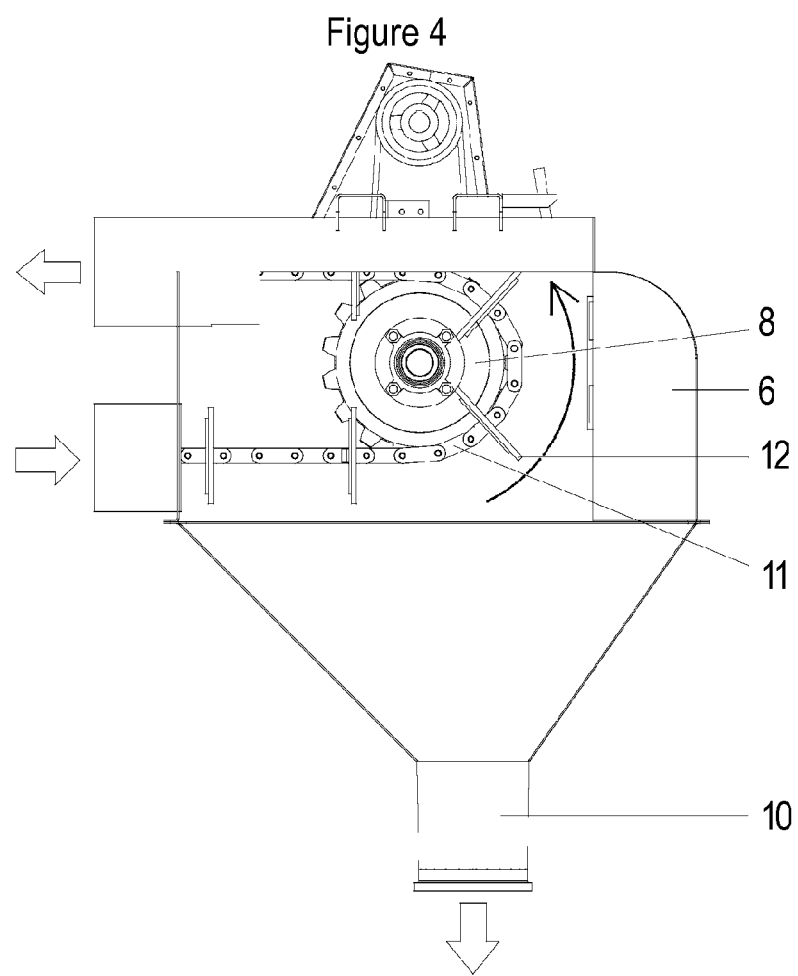

The structural configuration of the loading and unloading system applied to the conveyor with double flow includes direction changes limits 5 and 6 (FIGS. 3 and 4) of the chain 11 with draggers 12 which are generally established in the extremities of the assembly, wherein said limit of direction change 5 compounds by gears, which is moved 7 and loading point 9 of the bulk products, and the limit of direction change 6 provided with gear which moves the system 8 and unloading point 10 of bulk products. The function of the direction change limits consists on the movement of the chain with draggers integrated in a cyclic process, enabling the entrance, the exit or the displacement of the products of one point to another, according to the need of the process.

Due to the double flow of the conveyor, a specific type of hopper was developed for reception of products directly on the secondary pipe 16 of the equipment (FIGS. 5, 6 and 7) looking at to expand the odds of utilization of the circuit so that it is possible to transport more than one product simultaneously utilizing the same conveyor. The loading hopper 13 is made up of upper opening 14, top tube opening 15 provided with plate shaped in "V" inverted 18 in its outer wall and the secondary tube interval 16 featuring channel 17 for the product enter in bulk.

Figure 5:
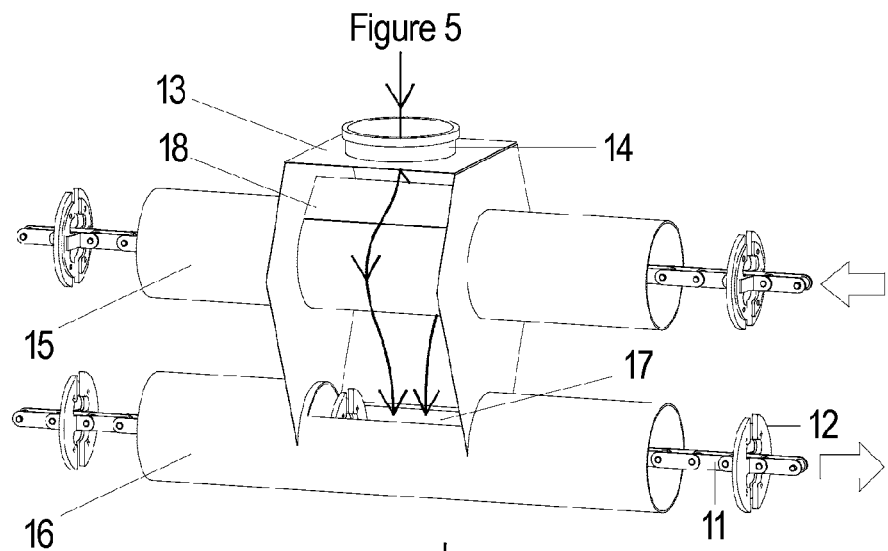
FIGS. 5, 6 and 7, lateral and frontal partial isometric reslice views of the double flow transportation system in detail for the loading hopper showing its configuration and operation principle.
Figure 6:
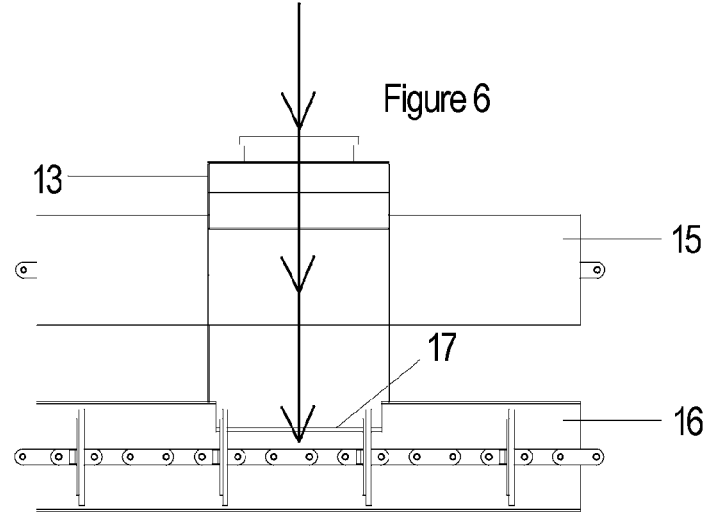
Figure 7:
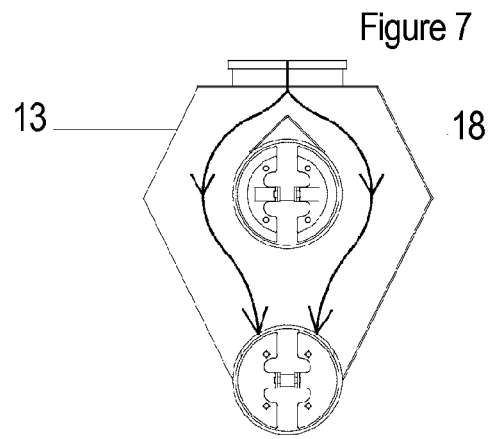

The loading hopper 13, indicated in the FIGS. 5, 6 and 7, can be installed instead of the system that better complies the needs of the process without being limited in barely one hopper. Its principle begins with the entrance of the product by the upper opening 14 of the apparatus through the conveyors with circular section or drag chain conveyors with square or rectangular section, transferring the product launched by the sides of the interval of the upper pipe 15 (indicated in the arrows) until reaching the interval of the secondary pipe 16 provided by a channel in its upper part 17, from where the product enters and continues its path to the next point of unload. Also it is presented a plate shaped in "V" inverted 18 in the external wall of the interval of the upper pipe 15 as a way to avoid the wear by abrasion of the pipe and to elevate the inclination of the wall, guaranteeing a total unload without occurring a stop or accumulation of products in the high part of the pipe, eliminating thus possible residues.

Figure 1:
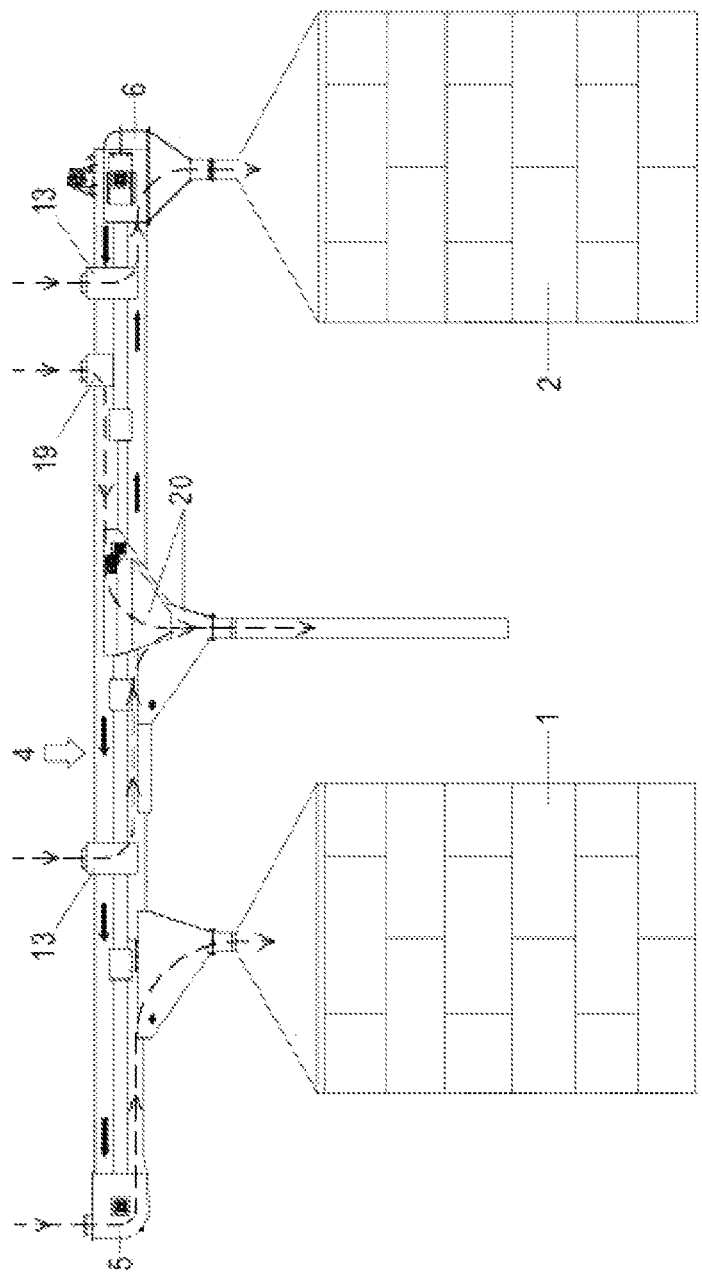
FIG. 1, lateral view of a conventional installation of vertical silos employing directly the double flow transportation system.
Figure 2:
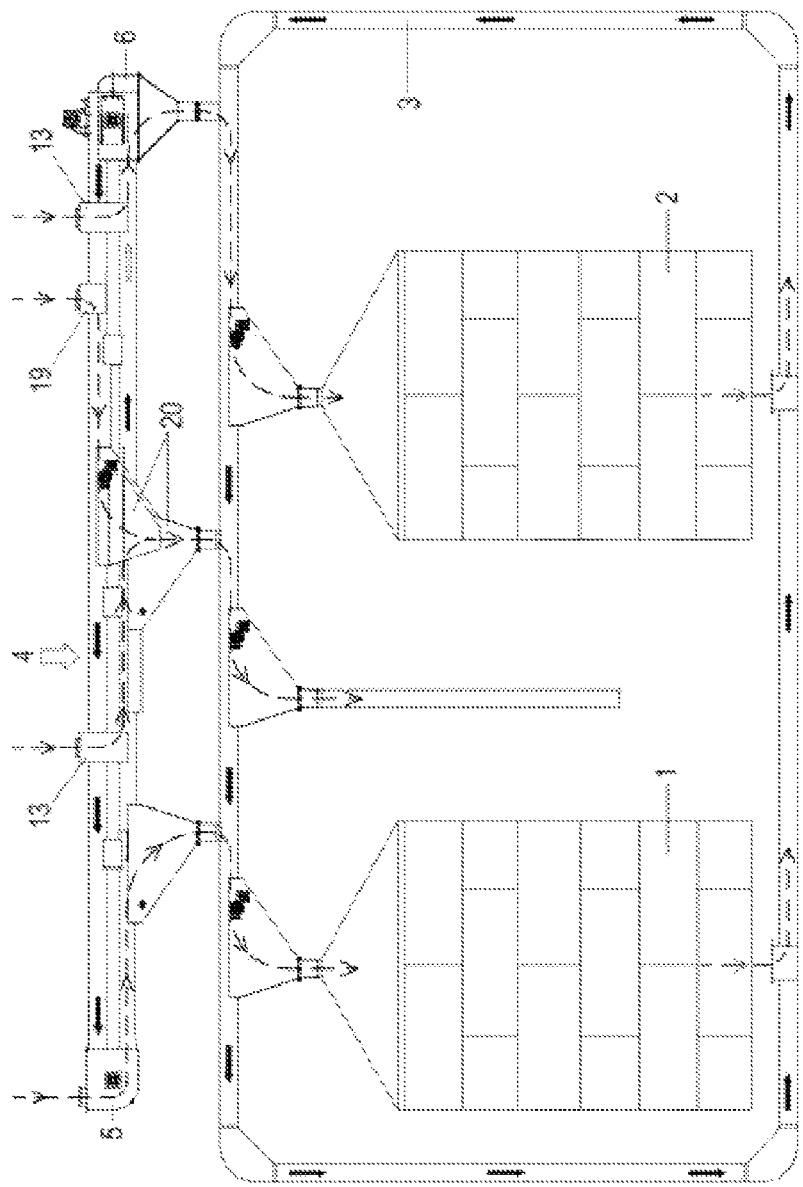
FIG. 2, lateral view showing a configuration variable applied to the vertical silos, utilizing the double flow transportation system adapted in a conventional conveyor.

For reception of products directly in the upper pipe 15, a conventional hopper is employed 19 that does not wrap the secondary pipe (indicated in the FIGS. 1 and 2).

Figure 8:
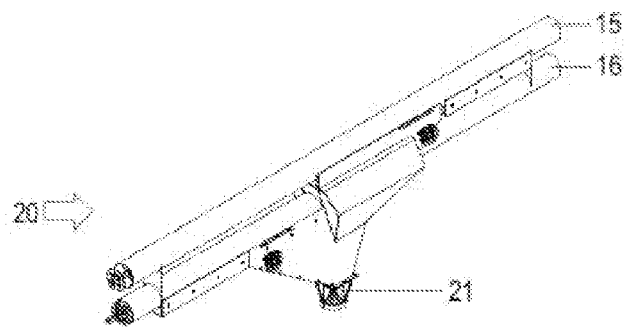
FIGS. 8, 9 and 10, partial isometric and lateral reslice views of the unload double system, showing its configuration and working principles.

Beyond the loading hopper 13, it was likewise developed the double unload system 20 (FIG. 8) that interconnects other intervals of both pipes 15 and 16 to an unload mouth 21 optionally adapted directly in the silos, in a second conveyor of circular section or drag chain conveyor with square or rectangular section 3 of bulk shipment, or even in an industrial equipment. The double discharge system 20 is composed of plates in form of drawers or sluices 22 and 22.1 arranged on the lower periphery of both intervals of the tubes 15 and 16, moved by the rack-and-pinion method 23 and 23.1 and gears 24 and 24.1, passages or channels 25 and 25.1 directly produced in the intervals of the tubes 15 and 16 and a plate shaped in "V" inverted 18 bound on the outside section of the secondary pipe interval 16. The quantity of double unload systems in the conveyor does not present limitations, being able to vary according to the need of the project.

Figure 9:
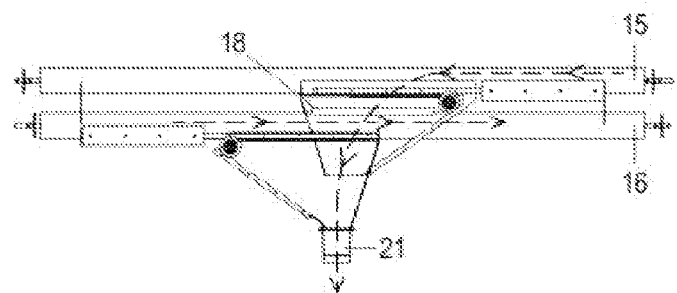
Figure 10:
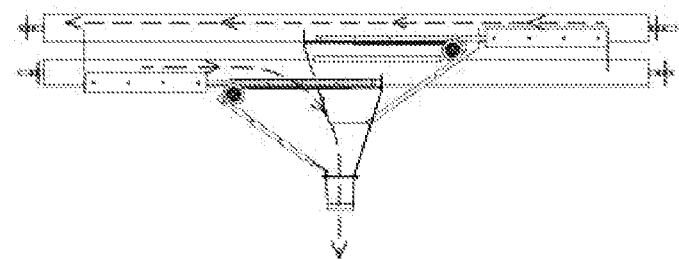

The working procedure of the double unload system 20, illustrated in FIG. 9, occurs when is necessary the transfer or unloads of some type of product without limiting the process of other products, that is to say, during the transportation of certain grain or seed in the secondary pipe 16 (indicated in the arrows), it is possible to unload another type of grain transported in the upper pipe 15 impeding the contact of both products or vice-versa (FIG. 10), taking advantage of the same system of chain with conveyor draggers for various possibilities of employment, seeking to soften the system as an all.

Figure 11:
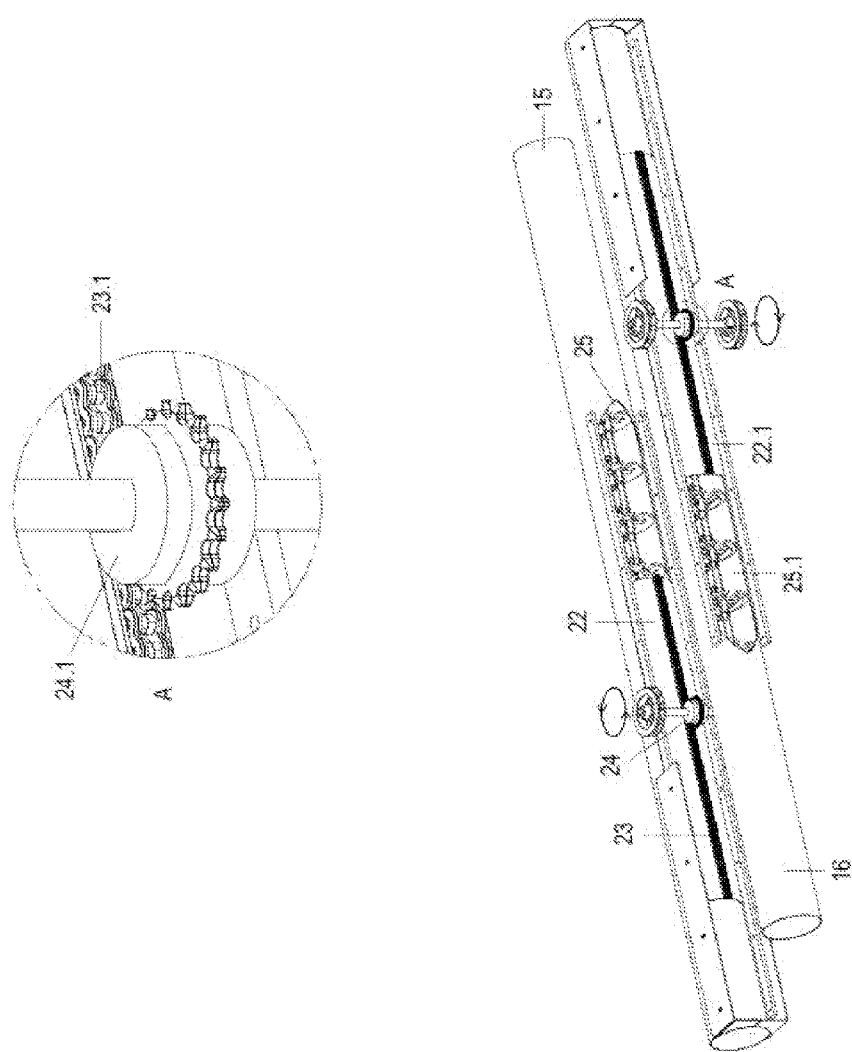
FIG. 11, partial view of the unload double system, detailing the method that permits the opening and closing of the floodgates belonging to the intervals of the pipes linked to the double flow transportation system.
Figure 12:
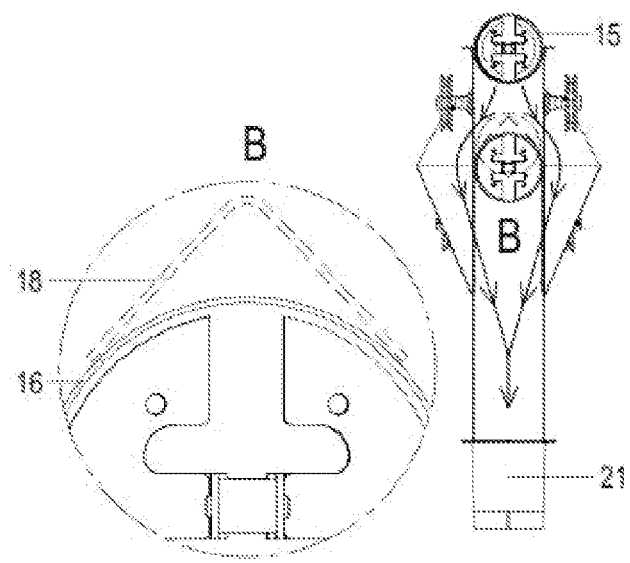
FIGS. 12 and 13, partial frontal view in detail and partial frontal view of the unload double system showing the sense of unload of the products of the upper pipe and secondary pipe, respectively.
Figure 13:
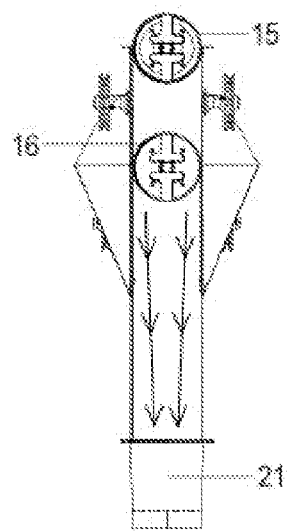

Internally, the double unload system 20 (FIG. 11) counts with plates in the shape of drawers or floodgates 22 arranged in the lower periphery of both intervals of the pipes 15 and 16, acquiring movement through a rack-and-pinion 23 and gears 24 connected with the principle of pulleys and known electric motors. The function of the floodgates 22 is to free the product for unload and to control its flow through the adjustment of the opening of the conducts or channels 25 produced directly in the intervals of the pipes 15 and 16. In the external upper section of the interval of the secondary pipe 16 it is introduced likewise a plate shaped in "V" inverted 18 (indicated in the FIG. 9 and in detail in the FIG. 12) with an identical function of the plate shaped in "V" inverted related to the hopper 13, avoiding the wear of the pipe and improving the unload of the products. Upon arising the need of unload the grains, fruits or seeds transported in the upper pipe 15, its floodgate 22 is driven, causing the product to flow through outer side of the secondary tube's interval 16, exactly on the surface of the plate shaped in "V" inverted 18 linked (indicated in the arrows of the FIG. 12) until reaching the mouth of unload 21 responsible for directing the product for storage or charge. During this process, a second different product can continue through the secondary pipe 16 for storage or any another end. Ina contrary situation, the contained product in the upper pipe 15 continues toward its destiny, as soon as the product of the interior of the secondary pipe 16 is drained toward the mouth of unload 21 (in the FIG. 13) through the operation and opening of its above-mentioned floodgate.

The main components belonging to the double flow transportation system, as the limit of change direction that move the system 6, the loading hopper 13 and double unload 20, still allow independently transportation on the conveyors of the circular section or drag chain conveyor with the square or rectangular section 3, preferentially to the MU8801337-5 (FIGS. 14 and 15) through simple adaptations. In this particular case, it uses the direction change edge 6 provided with gear 8, which moves the system, and unloading point 10 as purely illustrative example, but depending on the design to be developed, it is possible to use the threshold change of direction 5 composed of gear 7, which is moved, and loading point 9, to ease the equipment application possibilities and meet the specific needs of each user.

Of this conclusive form, the advantages related to this configuration related to the conventional systems of agricultural transportation determine the load points increase and unload of the products reducing the busy time with move-ments, loads or unload, enabling the process of two or more types of different products in the same system without risks of contamination or mixes of such products and its installation does not require large adaptations to the usual conveyors, transforming this invention in a highly influential instrument for the agricultural segment.

We claim:

1. A load and unload system applied to a conveyor system capable of transporting two or more different products, comprising:
    an upper pipe (15);
    a second pipe (16) arranged below the upper pipe (15);
    a conveyor belt capable of rotating loopily in the upper pipe (15) and the second pipe (16);
    at least one loading hopper (13) installed on a predetermined position of the upper pipe (15) and the second pipe (16), wherein the second pipe (16) has an opening (17) formed on an upper portion of the second pipe (16) corresponding to the at least one loading hopper (13), the at least one hopper (13) includes a first housing enclosing a portion of the upper pipe (15) and the opening formed on the second pipe (16), and the first housing includes an upper opening (14) for receiving products; and
    a first inverted "V" shaped plate installed on an upper portion of the upper pipe (15) enclosed by the first housing, wherein two arms of the first inverted "V" shaped plate are tangential to circumference of the upper pipe (15), such that the products received from the upper opening (14) are led by the two arms of the first inverted "V" shaped plate and fall into the second pipe (16) through the opening (17) formed on the upper portion of the second pipe (16).

2. The load and unload system applied to a conveyor system capable of transporting two or more different products according to claim 1, wherein the second pipe (16) has at least one lower opening (25) formed on a lower portion of the second pipe (16), the at least one lower opening is connected to an unload outlet (21) which is further connected to a vertical silo.

3. The load and unload system applied to a conveyor system capable of transporting two or more different products according to claim 2, wherein the upper pipe (15) has at least one lower opening formed on a lower portion of the upper pipe (15) corresponding to the unload outlet (21).

4. The load and unload system applied to a conveyor system capable of transporting two or more different products according to claim 3, further comprising:
    at least one double unload system (20) including:
        a second housing enclosing the at least one lower opening formed on the upper pipe (15) and a portion of the second pipe (16) corresponding to the at least one lower opening (25) formed on the lower portion of the second pipe (16); and a second inverted "V" shaped plate installed on an upper portion of the second pipe (16) enclosed by the second housing and below the at least one lower opening formed on the upper pipe (15), wherein two arms of the inverted "V" shaped plate are tangential to circumference of the second pipe (16), such that products received from the at least one lower opening formed on the upper pipe (15) are led by the two arms of the second inverted "V" shaped plate and fall into the unload outlet (21).

* * * * *